(12) United States Patent
McFarlin et al.

(10) Patent No.: US 9,843,534 B2
(45) Date of Patent: Dec. 12, 2017

(54) METHOD AND APPARATUS FOR MANAGING PROVISIONING AND UTILIZATION OF RESOURCES

(71) Applicant: HERE Global B.V., Veldhoven (NL)

(72) Inventors: Brent D. McFarlin, Lake Villa, IL (US); James M. Burke, Chicago, IL (US); MacGregor Felix, Romeoville, IL (US)

(73) Assignee: HERE Global B.V., Veldhoven (NL)

( * ) Notice: Subject to any disclaimer, the term of this patent is extended or adjusted under 35 U.S.C. 154(b) by 373 days.

(21) Appl. No.: 14/575,353

(22) Filed: Dec. 18, 2014

(65) Prior Publication Data

US 2016/0182397 A1 Jun. 23, 2016

(51) Int. Cl.
*H04L 12/26* (2006.01)
*H04L 12/911* (2013.01)
*G06F 9/00* (2006.01)
*H04L 12/24* (2006.01)

(52) U.S. Cl.
CPC ............. *H04L 47/78* (2013.01); *G06F 9/00* (2013.01); *H04L 41/5051* (2013.01); *H04L 41/0896* (2013.01); *H04L 41/5025* (2013.01)

(58) Field of Classification Search
CPC ..... H04L 47/78; H04L 41/5051; H04L 67/10; H04L 41/0896; H04L 41/5025
See application file for complete search history.

(56) References Cited

U.S. PATENT DOCUMENTS

| | | | | |
|---|---|---|---|---|
| 8,533,103 B1* | 9/2013 | Certain | ................. | G06Q 10/06 705/35 |
| 9,430,280 B1* | 8/2016 | Shih | ....................... | G06F 9/485 |
| 9,444,717 B1* | 9/2016 | Aithal | ................. | H04L 41/0896 |
| 9,479,382 B1* | 10/2016 | Ward, Jr. | .................. | G06F 9/50 |
| 2006/0152756 A1* | 7/2006 | Fellenstein | ............ | G06Q 40/04 358/1.15 |
| 2006/0212334 A1* | 9/2006 | Jackson | ................ | G06F 9/5027 709/226 |
| 2008/0300844 A1* | 12/2008 | Bagchi | ................... | G06Q 10/06 703/13 |
| 2010/0058347 A1* | 3/2010 | Smith | ...................... | G06F 9/50 718/104 |

(Continued)

*Primary Examiner* — Philip Chea
*Assistant Examiner* — Wuji Chen
(74) *Attorney, Agent, or Firm* — Ditthavong & Steiner, P.C.

(57) ABSTRACT

An approach is provided for managing the provisioning and utilization of resources. A management platform determines a request from a user for execution of one or more data processing tasks by a remote computing service. The management platform also processes and/or facilitates a processing of at least one execution constraint associated with the user, a group associated with the user, or a combination thereof to determine a maximum number of clusters, cluster instances, or a combination thereof of the remote computing service to be provisioned for fulfilling the request. The management platform further causes, at least in part, a provisioning of one or more clusters, one or more cluster instances, or a combination thereof to the user, the group, or a combination thereof to within the maximum number of clusters, cluster instances, or a combination thereof based on the at least one execution constraint.

20 Claims, 10 Drawing Sheets

(56) References Cited

U.S. PATENT DOCUMENTS

| | | | |
|---|---|---|---|
| 2012/0016721 A1* | 1/2012 | Weinman | G06Q 10/06 705/7.35 |
| 2012/0131591 A1* | 5/2012 | Moorthi | G06Q 10/06 718/104 |
| 2012/0198462 A1* | 8/2012 | Cham | G06F 9/5038 718/103 |
| 2013/0246208 A1* | 9/2013 | Jain | G06F 9/50 705/26.3 |
| 2016/0226955 A1* | 8/2016 | Moorthi | G06Q 10/06 |

* cited by examiner

100

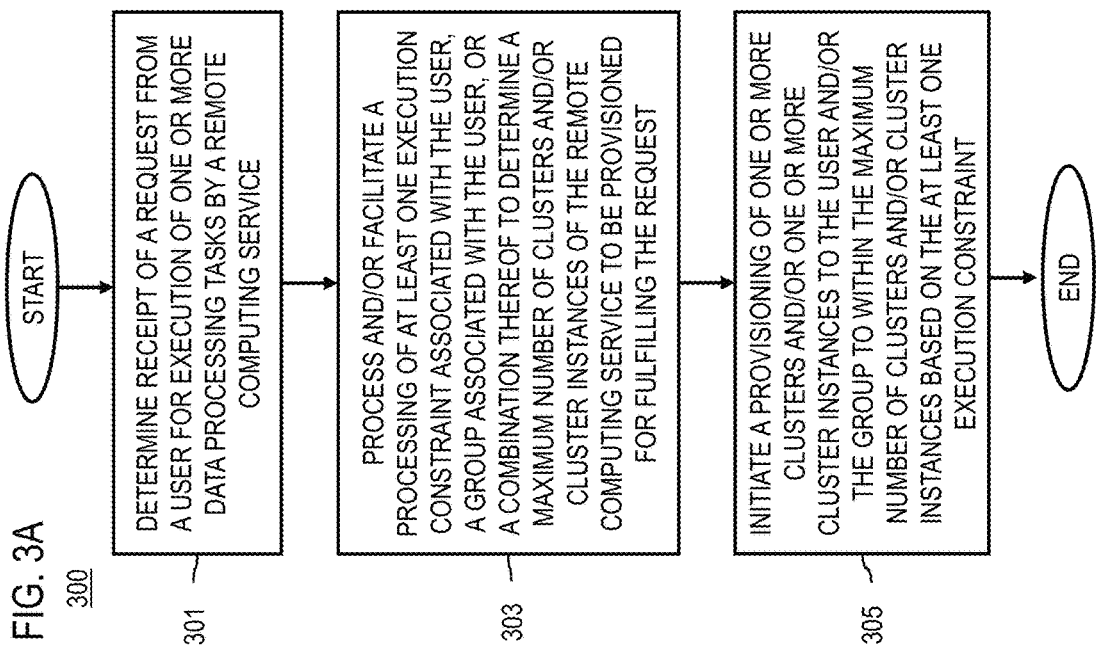

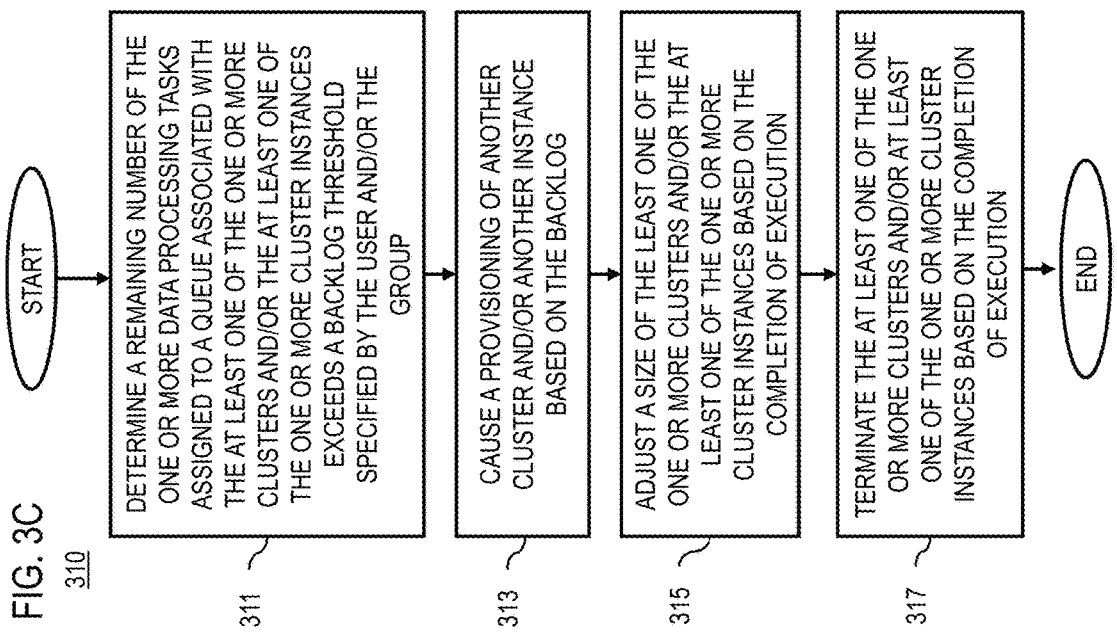

400

METHOD AND APPARATUS FOR MANAGING PROVISIONING AND UTILIZATION OF RESOURCES

BACKGROUND

Service providers and device manufacturers (e.g., wireless, cellular, etc.) are continually challenged to deliver value and convenience to consumers by, for example, providing compelling network services. One area of interest has been the deployment of cloud or cluster based services for enabling users to remotely access a collection of distributed resources (e.g., computers, servers, databases) for processing data via a communication network. Typically, the cluster based service operates on segments of a dataset provided by the user concurrently, thus distributing the data processing task across multiple resources to increase data processing efficiency. It then reintegrates the data to produce a final output based on the processing needs specified by the user. A user or group thereof may access the cluster based service in order to handle large data processing, storage or enterprise application needs.

Billing for the cluster based service is usually calculated on a price per resource, per hour basis, and may further depend on the type or configuration of the resource requested (e.g., large versus small server). Unfortunately, per this model, a cluster based service utilized for 10 minutes will still be billed to the user as it if were used for an hour; even though no further data processing tasks remain to be executed by the service. Still further, in the case where the user is a member of a group that shares access to the service, there is currently no convenient means of provisioning the service amongst members to enhance service utilization while controlling costs.

SOME EXAMPLE EMBODIMENTS

Therefore, there is a need for an approach for managing the provisioning of a shared resource based on user or group defined control parameters.

According to one embodiment, a method comprises determining a request from a user for execution of one or more data processing tasks by a remote computing service. The method also comprises processing and/or facilitating a processing of at least one execution constraint associated with the user, a group associated with the user, or a combination thereof to determine a maximum number of clusters, cluster instances, or a combination thereof of the remote computing service to be provisioned for fulfilling the request. The method further comprise causing, at least in part, a provisioning of one or more clusters, one or more cluster instances, or a combination thereof to the user, the group, or a combination thereof to within the maximum number of clusters, cluster instances, or a combination thereof based on the at least one execution constraint.

According to another embodiment, an apparatus comprises at least one processor, and at least one memory including computer program code for one or more computer programs, the at least one memory and the computer program code configured to, with the at least one processor, cause, at least in part, the apparatus to determine a request from a user for execution of one or more data processing tasks by a remote computing service. The apparatus is also caused to process and/or facilitate a processing of at least one execution constraint associated with the user, a group associated with the user, or a combination thereof to determine a maximum number of clusters, cluster instances, or a combination thereof of the remote computing service to be provisioned for fulfilling the request. The apparatus further causes, at least in part, a provisioning of one or more clusters, one or more cluster instances, or a combination thereof to the user, the group, or a combination thereof to within the maximum number of clusters, cluster instances, or a combination thereof based on the at least one execution constraint.

According to another embodiment, a computer-readable storage medium carries one or more sequences of one or more instructions which, when executed by one or more processors, cause, at least in part, an apparatus to determine a request from a user for execution of one or more data processing tasks by a remote computing service. The apparatus is also caused to process and/or facilitate a processing of at least one execution constraint associated with the user, a group associated with the user, or a combination thereof to determine a maximum number of clusters, cluster instances, or a combination thereof of the remote computing service to be provisioned for fulfilling the request. The apparatus further causes, at least in part, a provisioning of one or more clusters, one or more cluster instances, or a combination thereof to the user, the group, or a combination thereof to within the maximum number of clusters, cluster instances, or a combination thereof based on the at least one execution constraint.

According to another embodiment, an apparatus comprises means for determining a request from a user for execution of one or more data processing tasks by a remote computing service. The apparatus also comprises means for processing and/or facilitating a processing of at least one execution constraint associated with the user, a group associated with the user, or a combination thereof to determine a maximum number of clusters, cluster instances, or a combination thereof of the remote computing service to be provisioned for fulfilling the request. The apparatus further comprises means for causing, at least in part, a provisioning of one or more clusters, one or more cluster instances, or a combination thereof to the user, the group, or a combination thereof to within the maximum number of clusters, cluster instances, or a combination thereof based on the at least one execution constraint.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A-3E are flowcharts of processes for managing the provisioning of a shared resource based on user or group defined control parameters, according to various embodiments;

DESCRIPTION OF SOME EMBODIMENTS

Examples of a method, apparatus, and computer program for managing the provisioning of a shared resource based on user or group defined control parameters, according to one embodiment are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term cluster based service refers to any remotely accessible distributed computing system. For the purpose of illustration herein, this may include a cloud computing service, a distributed processing system, or any other methodologies and systems for distributing tasks across a network or various network resources.

Figure 1:
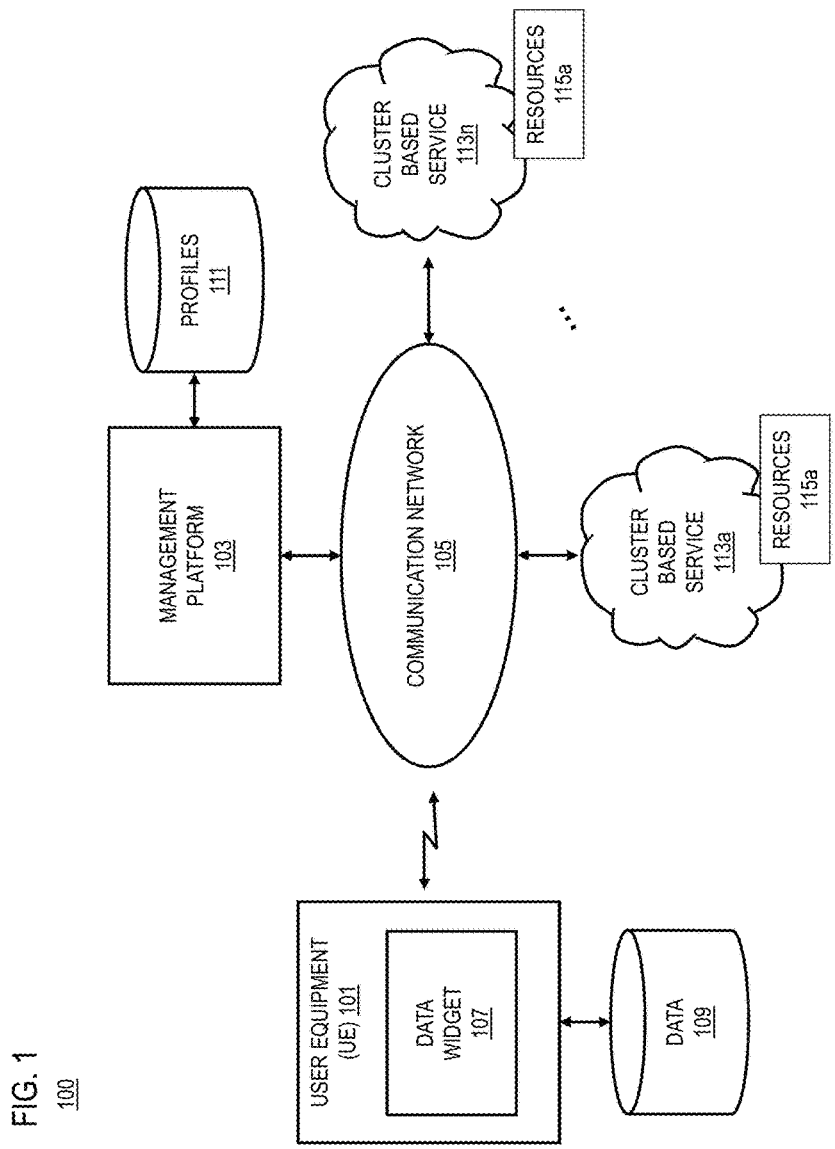
FIG. 1 is a diagram of a system for managing the provisioning of a shared resource based on user or group defined control parameters, according to one embodiment.

FIG. 1 is a diagram of a system for managing the provisioning of a shared resource based on user or group defined control parameters, according to one embodiment. In one embodiment, the system 100 includes a management platform 103 that is configured to interact with a cluster based service 113a-113n (referred to herein collectively as cluster based services 113) to affect the provisioning of one or more resources 115a-115n (referred to herein collectively as resources 115). By way of example, the cluster based service 113 may be accessed by the user of user equipment (UE 101) via a communication network 105 as a web service or hosted solution. The cluster based service 113 may further manage and distribute, upon request, the various resources 115 including one or more servers, one or more relational database systems, one or more multiplexers/processors, one or more data processing agents or services, or the like.

As noted previously, cluster based services have grown in popularity as a convenient way for application developers, data storage providers and others requiring access to high speed data processing resources, to acquire such resources. Typically, the cluster based service operates on segments of a dataset provided by the user concurrently, thus distributing the data processing tasks across multiple resources to increase data processing efficiency. The cluster based service allows the user to create a variably sized set of computing instances, referred to herein as a "cluster." Each instance may represent a specific resource, agent and/or virtual machine within a cluster for processing a segment of data and/or performing a task required to fulfilling a request (job) submitted to the cluster based service. It is noted therefore that instances can be of varying CPU size, storage/or data size, processing type, etc., and that a single cluster may include multiple cluster instances.

Active clusters can be adjusted to grow and shrink in size as different data processing tasks are running Also, the amount of time required to complete a job request depends on the size and amount of data to be processed per the request, the number of clusters or cluster instances required to be provisioned by the service for handling various data processing tasks associated with the job request, the configuration of the clusters, the operating system environment of the user, etc. Thus, tasks to be completed by various cluster instances may take hours or days. A typical cluster based service will therefore typically enable usage of its clusters and resources thereof for an hourly fee.

Per this billing model, a cluster used for 10 minutes will still be billed for a full hour, even though all data processing tasks have been completed. The hourly billing cycle continues until the cluster, and therefore, each cluster instance thereof, is terminated. In some instances the user is required to terminate the cluster manually. However, this requires the user to monitor the completion of each cluster instance manually or at least until the cluster is terminated, signifying the end of task execution. Unfortunately, this can still lead to significant charges being incurred by the user beyond the task at hand, especially in cases where the user forgets to disengage the cluster based service.

Also, in some instances, teams or groups of users may access the cluster based service under a single shared account. Per this approach, each group or user may exhibit varying usage patterns. For example, some groups may exhibit a linear cluster based service usage pattern while others may be more sporadic in their usage (e.g., ranging from no activity for a point in time to very heavy data processing activity and cluster usage). Consequently, the utilization of resources of the clusters affects the overall cost to the group. Since each cluster is typically charged by the hour, multiple short-lived clusters or instances thereof across teams may result in an organization incurring more costs than is necessary.

To address this problem, a system 100 of FIG. 1 introduces the capability for a user to define one or more execution constraints for controlling and managing the extent of processing of data by a cluster based service 113. By way of example, the system 100 includes a management platform 103, which is configured to operate in connection with the cluster based service 113 in conjunction with the a user of UE 101. Under this scenario, the management platform 103 may perform one or more of the following: (1) determine the submission of job requests and associated requirements thereof to be executed (fulfilled) by a cluster based service 113; (2) identify any user specified execution constraints; (3) monitor one or more cluster instances created by the cluster based service for executing various data processing tasks to determine their active lifecycle; (4) dynamically terminate or provision clusters or cluster instances based on the defined constraints; and (5) dynamically adjust the configuration of clusters to meet the constraint requirements.

It is noted that the management platform 103 may be configured as a hosted solution, as an operating component of a UE 101, or a combination thereof for performing the one or more above described tasks. In addition, the management platform 103 may execute various application programming interfaces (APIs) for facilitating interaction with the cloud based service accordingly for performing the aforementioned executions. Under this scenario, the management platform 103 may implement one or more custom and defined APIs in accordance with a standard development kit issued by the provider of the cluster based service 113. As such, individual users of the management platform 103 or cluster based service need not develop individual API modules for intelligently managing the provisioning of resources of the service 113 based on defined execution constraints.

In one embodiment, the execution constraints may be specified as a cost constraint (e.g., cost of task execution not to exceed x dollars), a time constraint (e.g., completion limit of y minutes/hours/days), a performance requirement (e.g., a central processor unit usage rate, a bandwidth utilization), a size constraint (e.g., a maximum number of nodes, a maximum cluster or cluster instance size), or a combination thereof. The execution constraints correspond to criteria and/or processing limits that must be accounted for, at the behest of the user or group, for affecting the provisioning of resources by the cluster based service 113. By way of example, each constraint may be translated into an effective number of units, where the number of available units indicates the maximum processing capacity of the cluster based service for fulfilling a job request.

Per this approach, the management platform 103 exercises control over the provisioning of resources (e.g., clusters, cluster instances) of the service by preventing the service from exceeding the constraint defined threshold. In one embodiment, the execution constraints may be specified by the user or group in advance of submission of a job/data processing request to the cluster based service 113. For example, the management platform 103 may maintain the constraints in association with a profile created in association with the user or the group, i.e., per database 111.

By way of example, a manager of a data analysis team may specify a group cost limit of x dollars or units. As such, when a request to process a large data file is submitted by a single member of the group, the management platform 103 references the profile database 111 to determine if any execution constraints are defined for the specific user. This may include, for example, identifying the user and their association with the group by way of an account number, a job number, an IP address, or some other reference data for aligning the user with the execution constraints. Under this scenario, the management platform 103 then performs various procedures, including limiting the number and/or size of clusters provisioned to the user based on the constraint, to ensure the corresponding job request is fulfilled. Still further, in the case of a group based provisioning of resources, the management platform 103 may support real-time monitoring of the clusters and/or instances thereof of respective group members, for dynamically maintaining the cost limit.

It is noted, per the above described execution, that the management platform 103 may serve as a "dispatcher" of sorts in its interaction with the cluster based service 113; ensuring the dispatching of the execution constraints in connection with the submission of a job request. Resultantly, the cluster based service 113 may serve as a "responder" for receiving the notification from the dispatcher and executing the request to the within the boundaries of the specified constraints.

In one embodiment, the management platform 103 interacts with the cluster based service 113 in order to determine the most effective utilization of the service relative to the execution constraints. This may include, for example, analyzing the data processing requirements as defined by the request (e.g., the processing tasks to be completed) against the configuration/type of the cluster or cluster instances thereof and the execution constraints. Under this scenario, the platform 103 is able to determine how many units the specified cluster configuration/type requires and the maximum number of units capable of being allocated based on the constraints. It is noted that this corresponds to a determining of a best case utilization and maximization of resources 115 to within the boundaries of the constraint.

For example, a large cluster required for executing a specific request may require be determined to require 7 units (of cost) while a small cluster may require only 3 units (of cost). In the case where the execution constraint is set to a max of 10 units for the user, the management platform 103 may determine the best (optimal) allowable provisioning of the resources of the cluster based service 113 relative to the constraints is as follows:

1. Enable the provisioning of 3 small clusters, for a total of 9 units;
2. Enable the provisioning of 1 small cluster and 1 large cluster, for a total of 10 units, but that is it).

In one embodiment, the management platform 103 initiates a request for the cluster based service 113 to provision the clusters or instances thereof according to the best case determination. For example, in the case above, the management platform 103 only enables resources to be provisioned within the confines of 10 units. As such, the platform 103 enables dedicated enforcement of the constraint while also accounting for the needs of the user for fulfilling the job request. Still further, in the case of dynamic changes, such as expedited/reduced processing times of an instance, an adaptation to the task to be performed, a reduced usage of units by another group member, or other changing conditions; the provisioning of the clusters or cluster instances may be further adapted accordingly. In contrast, an actual or expected increase in the amount of processing time required for execution of an instance based on the type of request submitted may result in, or require, a reduction in the number of units to 6 per group member.

Hence, the platform 103 allows the number of clusters, or even the instances in a cluster, to be increased or reduced as required based on the data processing tasks to be fulfilled, the cluster configuration, etc. The fulfillment is limited, or enforced, such that provisioning of resources 115 does not exceed the defined cost/time/performance ceiling. Still further, the platform 103 enables a balancing and/or optimizing of the job request to be performed based on group dynamics, such that the resources can be effectively increased or decreased based on a current or expected allocation of resources 115. Still further, by associating respective members with a group, the management platform 103 enables the linking of specific instances and/or tasks with the group budget/constraint.

In one embodiment, the management platform 103 further interacts with the cluster based service 113 in order to manage the lifecycle of one or more cluster instances provisioned to a user in response to a request. By way of example, the management platform 103 initiates a monitoring of each cluster instance—i.e., per API specific calls associated with the cluster based service 113. This may correspond to the assignment of an instance lifecycle manager (ILM) or monitoring agent for each instance of a cluster provisioned to fulfill a job request. Under this scenario, the platform 103 monitors when a specific data processing task is completed by an instance and whether there are any other data processing tasks queued and/or assigned for execution by the same instance of the cluster.

In the case where additional data processing tasks are queued for execution by the same instance, the instance lifecycle manager (ILM) makes this instance available to the next available or best processing task in the queue. Per this approach, the next best processing task may correspond to the task that best meets the cost, time, performance and overall processing constraints set forth by the group of user. As another example, the next best task may be associated with a specific user priority, timing priority, project priority, etc. Still further, in one embodiment, the ILM may also perform an elastic timing calculation, which allows the time for processing of a specific data processing task to be expanded or contracted depending on the current level of completion of a data processing task relative to the cost per hour, time availability, etc. Still In the case where no additional data processing tasks are queued, the ILM initiates termination of the instance. Per this approach, termination only occurs when no more work is to be performed by that instance (barring a user defined backlog threshold as discussed later on herein). It is noted that the cluster instances are therefore able to monitor themselves, repurpose/provision themselves to other tasks based on the constraints and terminate themselves accordingly without necessitating user intervention or global oversight. This is in contrast to managing the lifecycle or number of active or inactive instances manually or by waiting on termination by the cluster based service directly (upon job completion).

In one embodiment, the management platform 103 also enables the user to establish additional settings for managing the lifecycle of clusters or instances thereof. This includes, for example, specifying a backlog threshold parameter to associate with the queue for each cluster instance. The backlog threshold indicates a limit for a number of tasks within the queue (channel) for a given instance that can remain unexecuted. Under this scenario, when the number of tasks in the queue/channel the ILM is monitoring is greater than the threshold, the system will automatically provision another cluster to alleviate the backlog. This is executed only if the work request can be fulfilled to within the number of available units (within the defined constraints). Thus, it is noted that the management platform 103 further manages the provisioning of clusters on the basis of the availability of data processing tasks to be completed backlog and as dictated by the queue. Still further, each queue is only allowed a certain amount of backlog before the management platform initiates a provisioning of another cluster or instance thereof to manage the backlog.

As shown in FIG. 1, the system 100 comprises a user equipment (UE) 101 having connectivity to the management platform 103 via a communication network 105. The UE 101 may be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, a request widget 107 may be configured to the UE 101 for enabling interaction with the management platform 103. Under this scenario, the request widget 107 may include various user interface elements, input elements, or the like for enabling the user to initiate the submission of a job request to the cluster based service 113. The job request data may be maintained in a database 109 of the UE 101 or alternatively, at a remote data store. In addition, the request widget 107 may receive status information from the cluster based services 113 and/or management platform 103 regarding the status of a submitted job, the provisioning of resources 115, etc. Still further, the request widget may also receive an input for specifying user or group defined execution constraints, a backlog threshold, various job request fulfillment requirements, etc. It is noted that the request widget may be implemented as a software module, service, or other executable component for supporting interaction with the management platform 103 and cluster based service 113.

The communication system 105 of system 100 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UE 101, management platform 103 and cluster based service 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
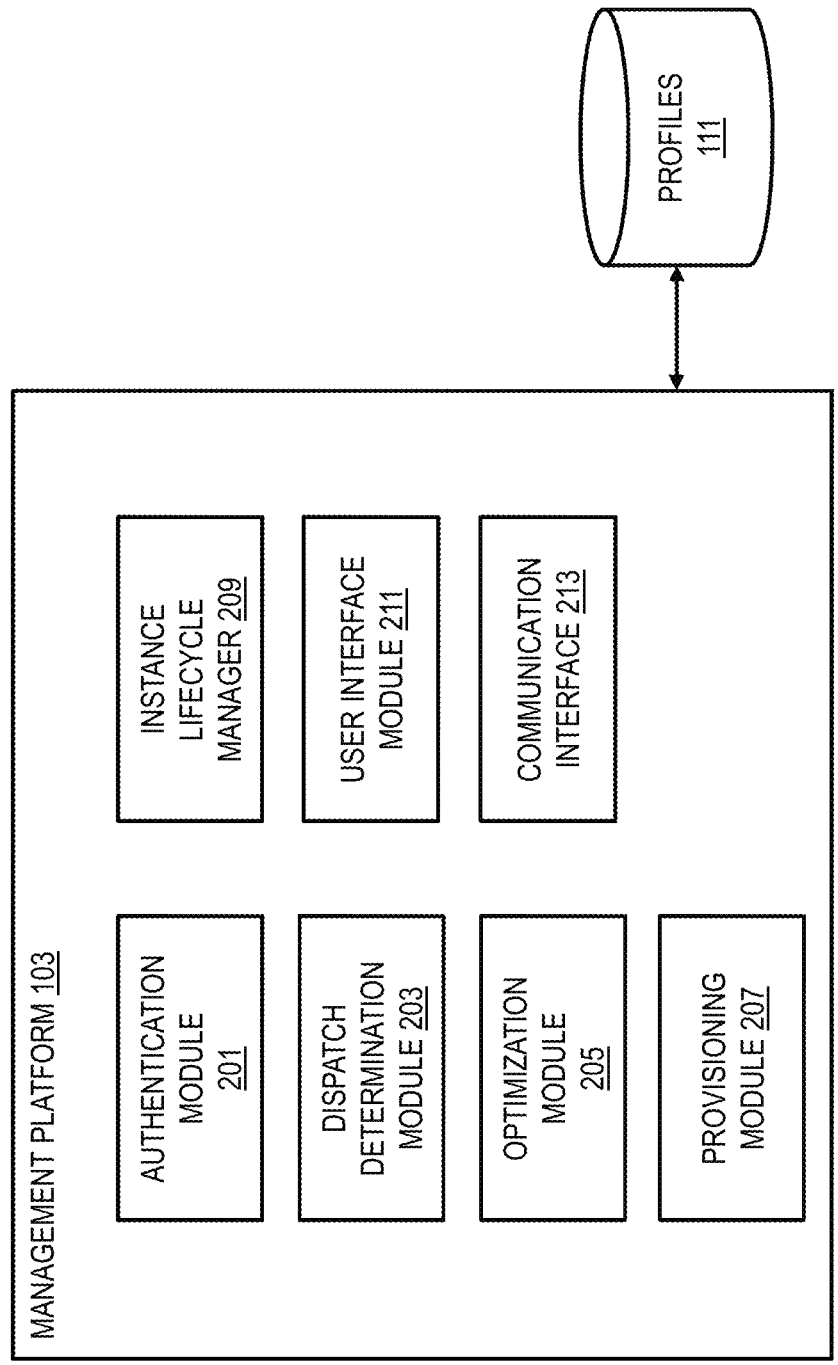
FIG. 2 is a diagram of the components of a management platform, according to one embodiment.
Figure 3E:
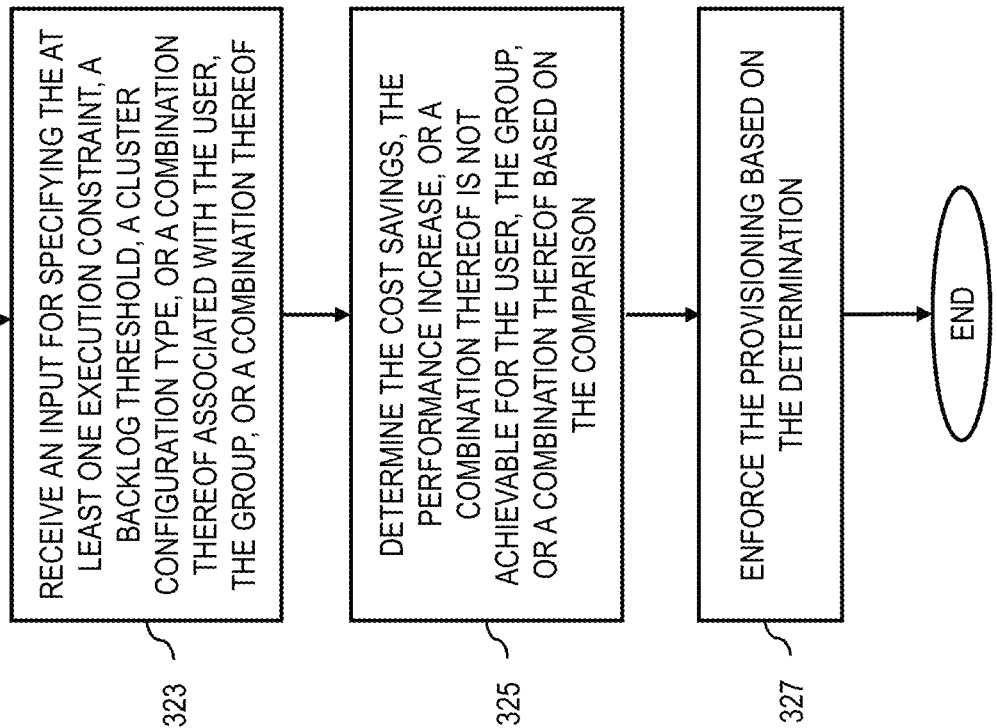

FIG. 2 is a diagram of the components of a management platform, according to one embodiment. By way of example, the management platform 103 includes one or more components for managing the provisioning of a shared resource based on user or group defined control parameters. It is contemplated that the functions of these components may be combined in one or more components or performed by other components of equivalent functionality.

In one embodiment, an authentication module 201 authenticates users and UE 101 for interaction with the management platform 103. By way of example, the authentication module 201 receives a request to associate user of group specified execution constraints with a profile maintained for the user and/or group. The execution constraints may include, for example, a cost limit, a performance or data processing requirement, a time limit, etc. In addition, the authentication module 201 may receive an input for specifying a backlog threshold to associate with one or more instances provisioned for execution of a data processing request.

In one embodiment, the dispatch module 203 may also interact with the communication module 209 to determine the submission of a job request by a UE 101. The job request may be indicated to the authentication module 201 as a status message. It is noted that the status message may indicate details provided per the request, and may include, for example, the (1) the work to be done and the requirements thereof; (2) a cluster type/configuration, where each cluster type corresponds to a specific name/configuration for fulfilling the work (e.g., large or small cluster to do work) per the availability of the cluster based service 113; and the (3) account level controls/constraints, i.e., the maximum number of units/threshold/costs for each cluster configuration.

Upon determining the request, the dispatch module 203 triggers execution of the optimization module 205, which determined the best scenario provisioning of clusters and instances thereof based on the established constraints. For example, the optimization module 205 may determine the maximum number of units and/or corresponding clusters available based on the availability and capabilities of the cluster based service 113, the execution constraints (e.g., a cost ceiling), etc.

In one embodiment, the optimization module 205 interacts with the provisioning module 207, which initiates a provisioning of the resources of the cluster based service 113 based on the determined optimization result. By way of example, when it is determined that an upper limit of 3 clusters may be provisioned to the requesting user based on an established cost constraint, the provisioning module initiates this allocation. Under this scenario, the provisioning module 207 may transmit the request for this provisioning of resources to the cluster based service 113 by way of the communication interface 113.

In one embodiment, the instance lifestyle manager (ILM) monitors and manages one or clusters or cluster instances provisioned for use by the user based on the request. By way of example, the ILM may be associated with each instance within the cluster for determining when a data processing task associated with the instance is completed. Based on a backlog threshold, the ILM may further determine when to terminate an instance of the cluster in response to a backlog of data processing tasks queued for a specific instance. Still further, the ILM may enable the dynamic adjusting—i.e., reducing or increasing, terminating or establishing, or one or more clusters provisioned to the user based on the execution constraints, current changes in data processing tasks to be completed, etc.

In one embodiment the user interface module 211 enables presentment of a graphical user interface for interacting with the management platform via the UE 101. By way of example, the user interface module 215 generates the interface in response to application programming interfaces (APIs) or other function calls corresponding to the cluster based service 113; thus enabling the display of graphics primitives, the submission of input, etc.

In one embodiment, a communication module 213 enables formation of a session over a network 105 between the management platform 103 and the request widget 107. By way of example, the communication module 213 executes various protocols and data sharing techniques for enabling collaborative execution between a UE 101 (e.g., mobile devices, laptops, smartphones, tablet computers, desktop computers) and the management platform 103 over the network 105.

The above presented modules and components of the management platform 103 can be implemented in hardware, firmware, software, or a combination thereof. For example, although the management platform 103 is depicted as a separate entity or as a platform or hosted solution in FIG. 1, it is contemplated it may be implemented for direct operation by respective UE 101*a*-101*n*. As such, the management platform 103 may generate direct signal inputs by way of the operating system of the UE 101 for interacting with the request widget 107. Alternatively, some of the executions of the above described components may be performed at the UE 101*a*-101*n* while others are performed offline or remotely per a client server interaction model between the UE 101*a*-101*n* and the platform 103.

Figure 6:
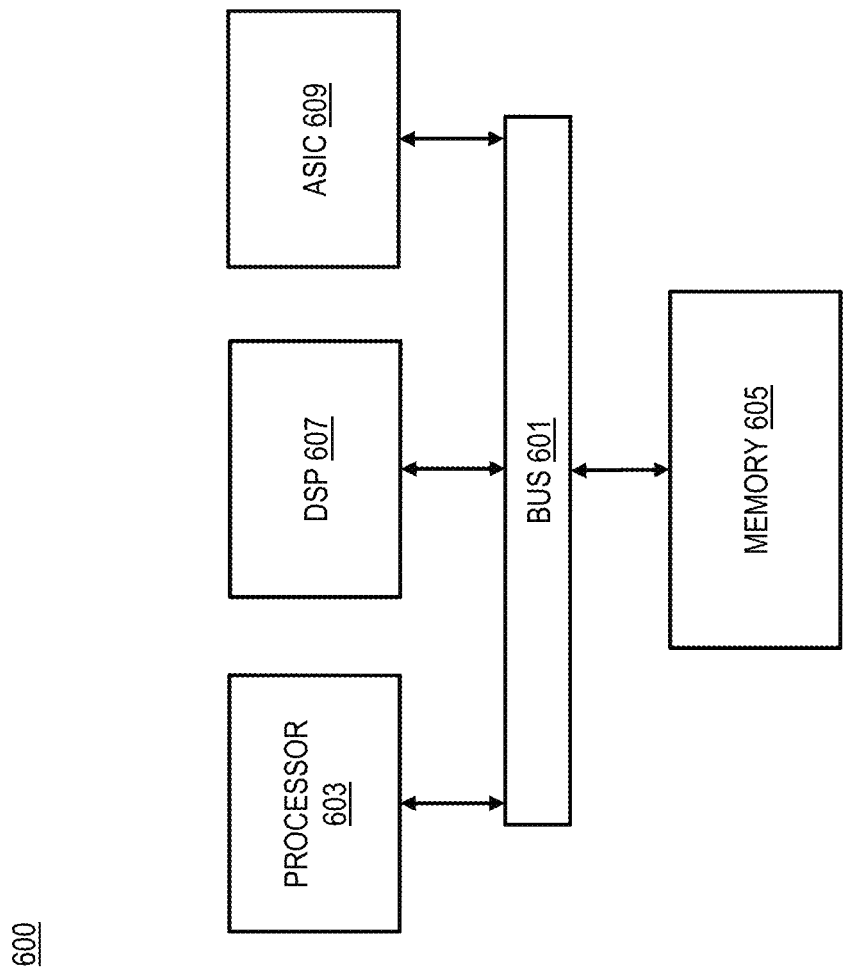
FIG. 6 is a diagram of a chip set that can be used to implement an embodiment of the invention.

FIGS. 3A-3E are flowcharts of processes for managing the provisioning of a shared resource based on user or group defined control parameters, according to various embodiments. In one embodiment, the management platform 103 performs the processes and is implemented in, for instance, a chip set including a processor and a memory as shown in FIG. 6.

In step 301 of process 300 (FIG. 3A), the management platform 103 determines receipt of a request from a user for execution of one or more data processing tasks by a remote computing service. As noted, the request may be submitted by way of the request widget of the UE. In another step 303, the platform 103 processes and/or facilitates a processing of at least one execution constraint associated with the user, a group associated with the user, or a combination thereof to determine a maximum number of clusters, cluster instances, or a combination thereof of the remote computing service to be provisioned for fulfilling the request. Per step 305, the platform 103 initiates a provisioning of one or more clusters, one or more cluster instances, or a combination thereof to the user, the group, or a combination thereof to within the maximum number of clusters, cluster instances, or a combination thereof based on the at least one execution constraint. As noted, the execution constraints define the boundaries, limits, ceilings, or thresholds to be accounted for by the management platform 103 for enabling the provisioning of resources.

In step 307 of process 306 (FIG. 3B), the management platform 103 determines a completion of execution of at least one of the one or more data processing tasks by at least one of the one or more clusters, at least one of the one or more cluster instances, or a combination thereof based on the provisioning. In step 309, the platform 103 assigns the other of the one or more data processing tasks to the at least one of the one or more clusters, the at least one of the one or more cluster instances, or a combination thereof based on the completion of execution. It is noted that the provisioning of resources is based on the assignment.

In step 311 of process 310 (FIG. 3C), the management platform 103 determines a remaining number of the one or more data processing tasks assigned to a queue associated with the at least one of the one or more clusters, the at least one of the one or more cluster instances, or a combination thereof exceeds a backlog threshold specified by the user, the group, or a combination thereof. As mentioned previously, this corresponds to the dynamic repurposing of a created instance for optimizing the effective use of an already paid for and/or provisioned resource. In another step 313, the platform 103 causes, at least in part, a provisioning of another cluster, another instance, or a combination thereof based on the backlog. It is noted that the assignment of the cluster or instance thereof is based on the exceeding of the backlog threshold, wherein the threshold automates the action to adapt the resource allocation.

In step 315, the management platform 103 adjusts a size of the at least one of the one or more clusters, the at least one of the one or more cluster instances, or a combination thereof based on the completion of execution. Per step 317, the platform 103 terminates the at least one of the one or more clusters, at least one of the one or more cluster instances, or a combination thereof based on the completion of execution. It is noted that the adjustment is based on the assignment, the termination, or a combination thereof. Also, the termination corresponds to the ability of the management platform 103 to automatically reduce the cluster or instances thereof to maximize efficiency and minimize cost.

In step 319 of process 318 (FIG. 3D), the management platform 103 compares the at least one execution constraint against (a) an availability of the at least one of the one or more clusters, the at least one of the one or more cluster instances, or a combination thereof based on the execution of the at least one data processing task, (b) a payment rate associated with the remote computing service, (c) a payment amount rendered by the user, the group, or a combination thereof to the remote computing service, (d) an estimated time of completion of execution of the one or more data processing tasks, (e) an estimated utilization of the remote computing service by the user, the group, or a combination thereof, or (f) a combination thereof.

In another step 321, the management platform 103 determines a cost savings, a performance increase, or a combination thereof is achievable for the user, the group, or a combination thereof based on the comparison. As noted previously, the provisioning is based on the cost savings, the performance increase, or a combination thereof.

In step 323 of process 322 (FIG. 3E), the management platform 103 receives an input for specifying the at least one execution constraint, a backlog threshold, a cluster configuration type, or a combination thereof associated with the user, the group, or a combination thereof. As noted previously, this input may be associated with the submission of the initial request for execution of the one or more data processing tasks.

In step 325, the management platform 103 determines the cost savings, the performance increase, or a combination thereof is not achievable for the user, the group, or a combination thereof based on the comparison. Per step 327, the platform 103 may also enforce the provisioning based on the determination. It is noted that this enforcement may correspond to the generation of a message, an alert, or the like for indicating a denial of a provisioning request exceeding or in defiance of the established execution constraints.

Figure 4A:
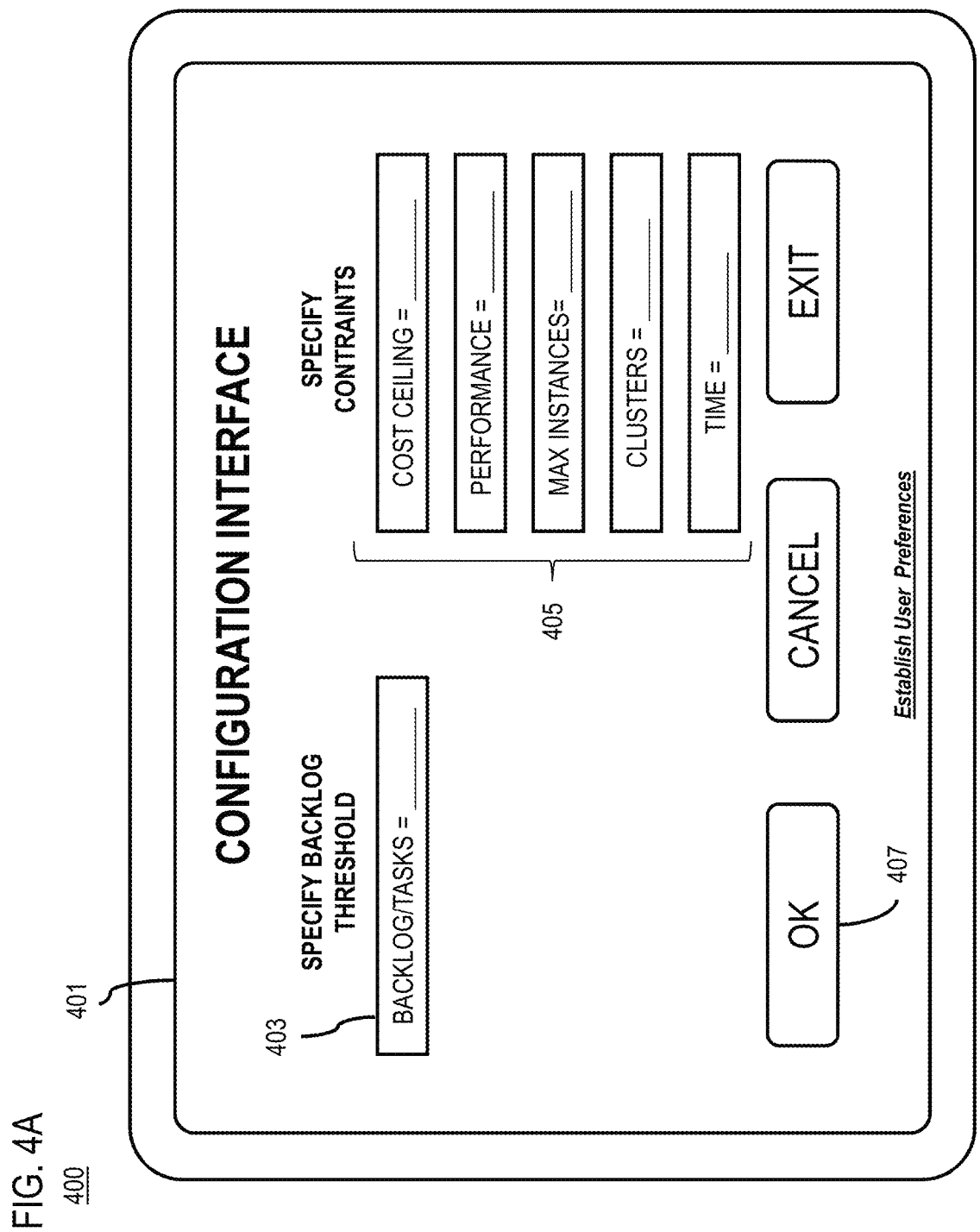
FIG. 4A is a diagram of user interface utilized in the processes of FIG. 3, according to one embodiment.

FIG. 4A is a diagram of user interface utilized in the processes of FIG. 3, according to one embodiment. By way of example, a configuration interface 401 is presented to the display of a user device 400. Under this scenario, the user device 400 is configured to operate a request widget for interacting with the management platform 103. The configuration interface 401 includes various user input fields

405 for enabling specification of the various execution constraints. This includes a field for receiving a cost ceiling input, a performance level or type input (e.g., CPU rate), a maximum number of clusters or cluster instances and a time limit.

The interface 401 also presents an input field 403 for enabling user specification of a backlog threshold. For example, in the case where the threshold is set to 4 and a data processing task channel/queue for an instance exceeds this amount, the management platform 103 may automatically initiate the provisioning (or creation) of another cluster to address this backlog of tasks. Once entered, the user may then select the OK action button 407 to initiate transmission of the input to the management platform 103.

Figure 4B:
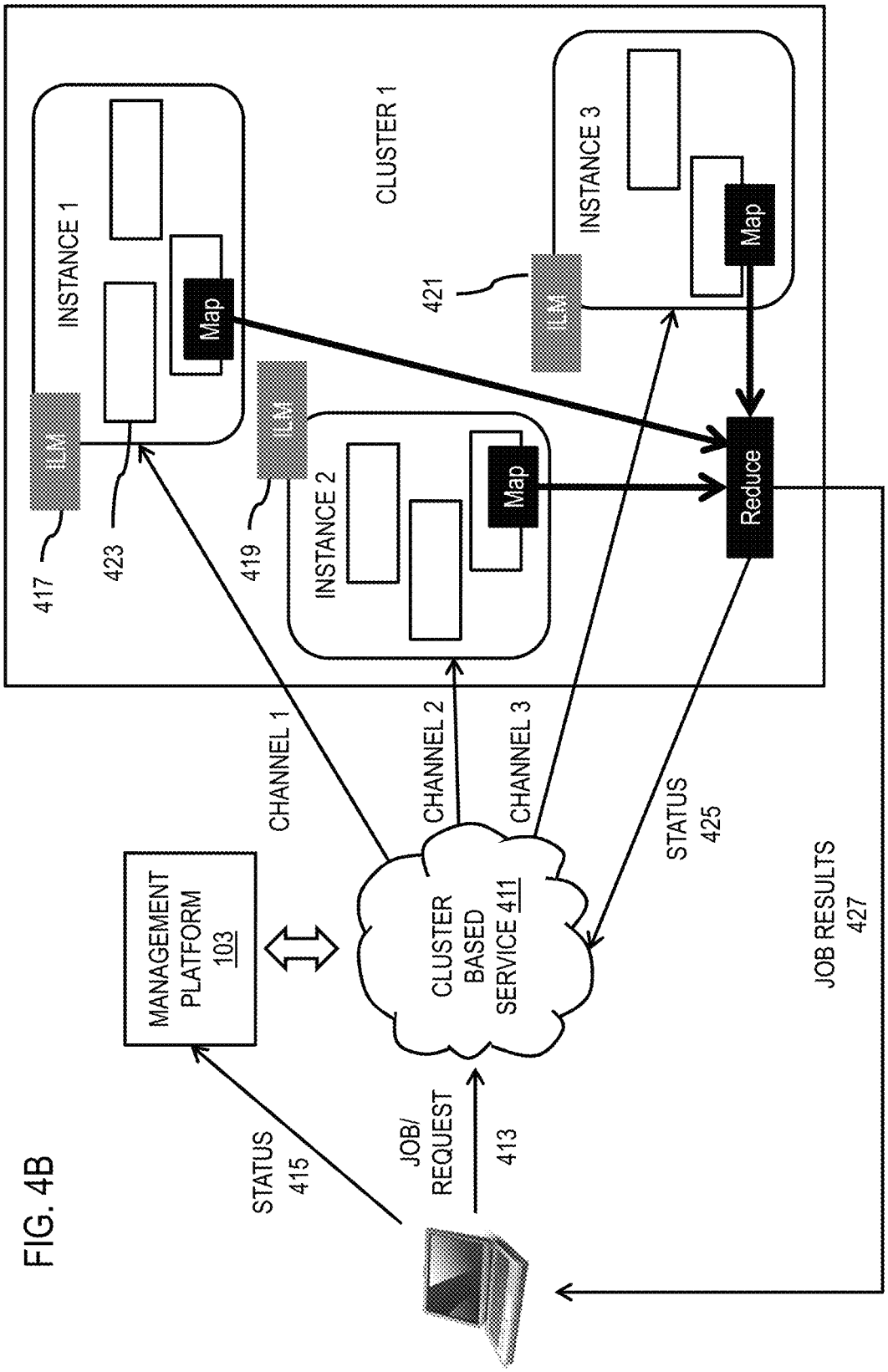
FIG. 4B is a diagram depicting an interaction between a cluster based service and the management platform for facilitating a data processing request submitted by a user, according to an exemplary embodiment.

FIG. 4B is a diagram depicting an interaction between a cluster based service and the management platform for facilitating a data processing request submitted by a user, according to an exemplary embodiment. The cluster based service 411 is configured to interact with the management platform 103 for optimizing the use and provisioning of one or more clusters or instances generated by the service 411. By way of example, the optimization is based on input provided by the user via interface 401 of FIG. 4A, wherein the execution constraints and backlog threshold values were specified.

In FIG. 4B, the management platform 103 is able to determine that a job/data processing request 413 is submitted to the cluster based service 411. Under this scenario, the management platform 103 operates in a dispatch mode, whereby it is able to detect job requests and identify which agents/responders are to fulfill the job. The detection corresponds to the receipt of a status message 415 for indicating the request, the execution constraints associated therewith, the job fulfillment requirements, etc.

Once received, the management platform 103 further interacts with the cluster based service 411 to determine the most effective utilization of the service relative to the execution constraints. By way of example, the platform 103 determines how many units the specified cluster configuration/type requires and the maximum number of units capable of being allocated based on the constraints. This corresponds to a determination of maximum number of clusters and/or instances thereof capable of being provisioned to the user to fulfill the request. In this example, the calculation corresponds to three instances labeled INSTANCE 1-3, all of which belong to a single cluster labeled CLUSTER 1. It is noted that this corresponds to a determining of a best case utilization and maximization of resources 115 to within the boundaries of the constraint Based on this calculation, the management platform 103 causes the service 111 to initiate the provisioning of the instances to fulfill the request 413. This corresponds to the opening of channels labeled CHANNELS 1-3 for distributing segments of data (provided as input per the request 413) to the various instances. Under this scenario, the data is segmented and distributed in chucks (e.g., data block 423). The data chunks are further mapped and then reduced as part of a data reduction procedure for generating a final output (fulfillment of the request). It is noted that other processing procedures may likewise be performed.

The management platform 103 may also assign, via one or more application programming interface calls, an instance lifecycle manager (ILM) to each cluster instance, corresponding to ILMs 417-421 respectively. Per the ILMs 417-421, the platform 103 monitors when a specific data processing task is completed by an instance and whether there are any other data processing tasks queued and/or assigned for execution by the same instance of the cluster. This corresponds to a monitoring of the processing of the different data chunks (e.g., data block 423) for a given instance, monitoring the discarding or mapping of data blocks, and identifying any additional data blocks that are queued via a channel (e.g., CHANNEL 1) to receive additional data to process. It is noted that the ILMs 417-421 continuously monitor the instances.

For example, in the case of ILM 417, when additional data processing tasks are queued for execution by the same instance per CHANNEL 1, the instance lifecycle manager (ILM 417) makes this instance immediately available to the next available or best processing task in the queue. The ILM may also perform an elastic timing calculation, which allows the time for processing of a specific data processing task to be expanded or contracted depending on the current level of completion of a data processing task being handled by the instance relative to the established constraint.

Still further, the ILM may terminate instances as well to prevent them from being a cost variable. This corresponds to a case where there is no remaining data processing tasks remain to be performed by INSTANCE 1. This also corresponds to a scenario wherein the backlog if any of data processing tasks in the queue (e.g., per CHANNEL 1) is less than the established backlog threshold. Hence, as the data processing tasks are executed by each instance within the confines of the established constraints, the cluster instances monitor themselves, repurpose/provision themselves. This corresponds to a continual, dynamic adjusting of the one or more instances within the boundaries of the cost, performance, time, or other constraints set form. Eventually, after each data processing task is completed and the result is mapped and reduced, the instances reduce in size until eventually they are terminated. Once all of the instances are terminated, the cluster (CLUSTER 1) is eventually terminated as well, resulting in a completion status message 425 being rendered to the cluster based service and the corresponding management platform 103. The job results 427 (e.g., the reduced data set) is also submitted to the user as requested.

It is contemplated, in future embodiments, that the cost savings and/or performance enhancements achieved as a result of usage of the management platform 103 in connection with the cluster based service 411 may be rendered as a report or message to the requesting user. So, for example, a cost-benefit analysis report may be indicated along with the job results 427 for indicating the optimized used of the cluster instances to fulfill the job request 413, the various users of the group who contributed to the execution of the tasks and/or use of the budget, one or more future execution constraint recommendations based on the capabilities of the cluster based service 413, etc.

The processes described herein for managing the provisioning of a shared resource based on user or group defined control parameters may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 5:
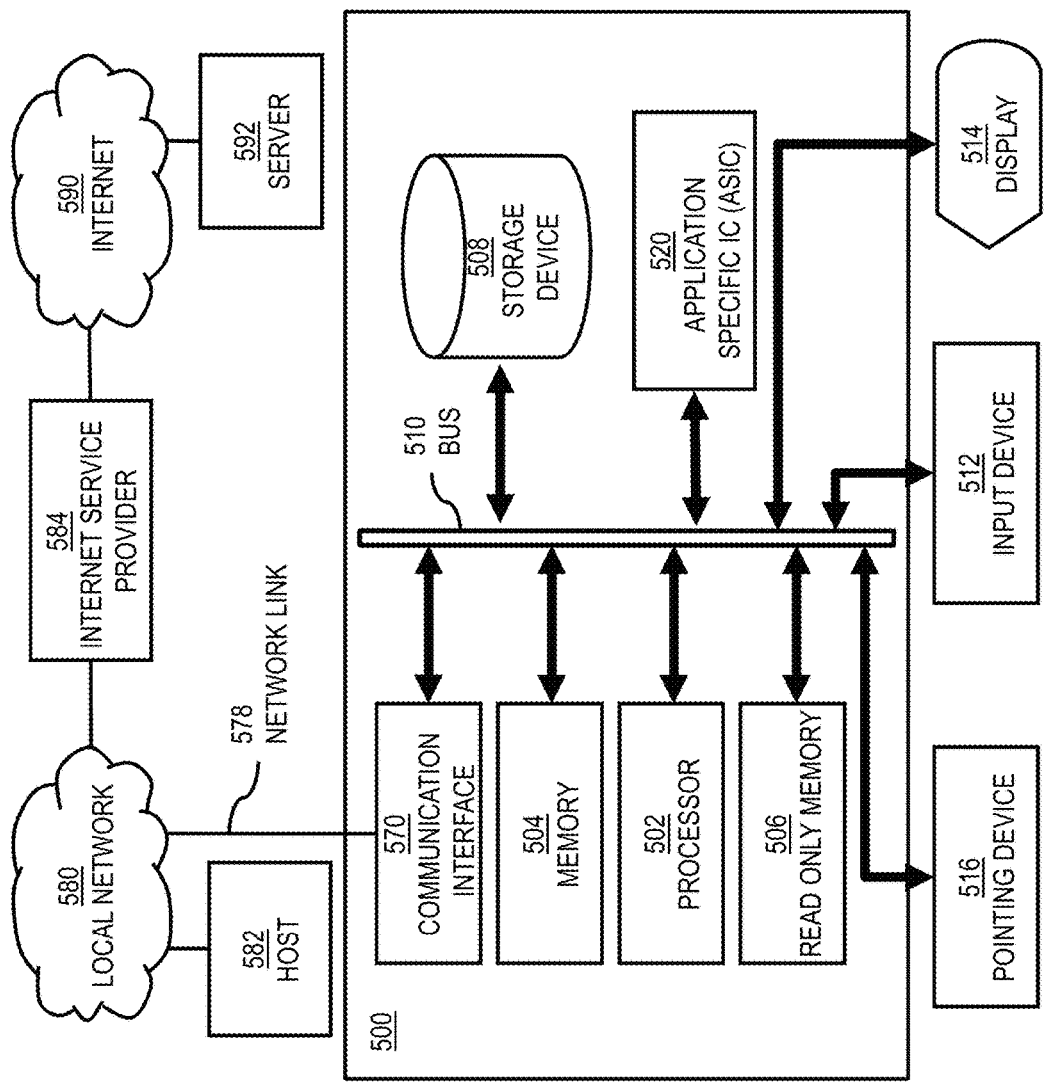
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) for managing to provision a shared resource based on user or group defined control parameters as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps for managing of provisioning of a shared resource based on user or group defined control parameters.

A bus 510 includes one or more parallel conductors of information so that information is transferred quickly among devices coupled to the bus 510. One or more processors 502 for processing information are coupled with the bus 510.

A processor (or multiple processors) 502 performs a set of operations on information as specified by computer program code related for managing to provision a shared resource based on user or group defined control parameters. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or any other dynamic storage device, stores information including processor instructions for managing the provisioning of a shared resource based on user or group defined control parameters. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or any other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for managing the provisioning of a shared resource based on user or group defined control parameters, is provided to the bus 510 for use by the processor from an external input device 512, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT), a liquid crystal display (LCD), a light emitting diode (LED) display, an organic LED (OLED) display, a plasma screen, or a printer for presenting text or images, and a pointing device 516, such as a mouse, a trackball, cursor direction keys, or a motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for managing the provisioning of a shared resource based on user or group defined control parameters to the UE 101.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or any other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set or chip 600 upon which an embodiment of the invention may be implemented. Chip set 600 is programmed for managing to provision a shared resource based on user or group defined control parameters as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps for managing of provisioning of a shared resource based on user or group defined control parameters.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein for managing to provision a shared resource based on user or group defined control parameters. The memory 605 also stores the data associated with or generated by the execution of the inventive steps.

Figure 7:
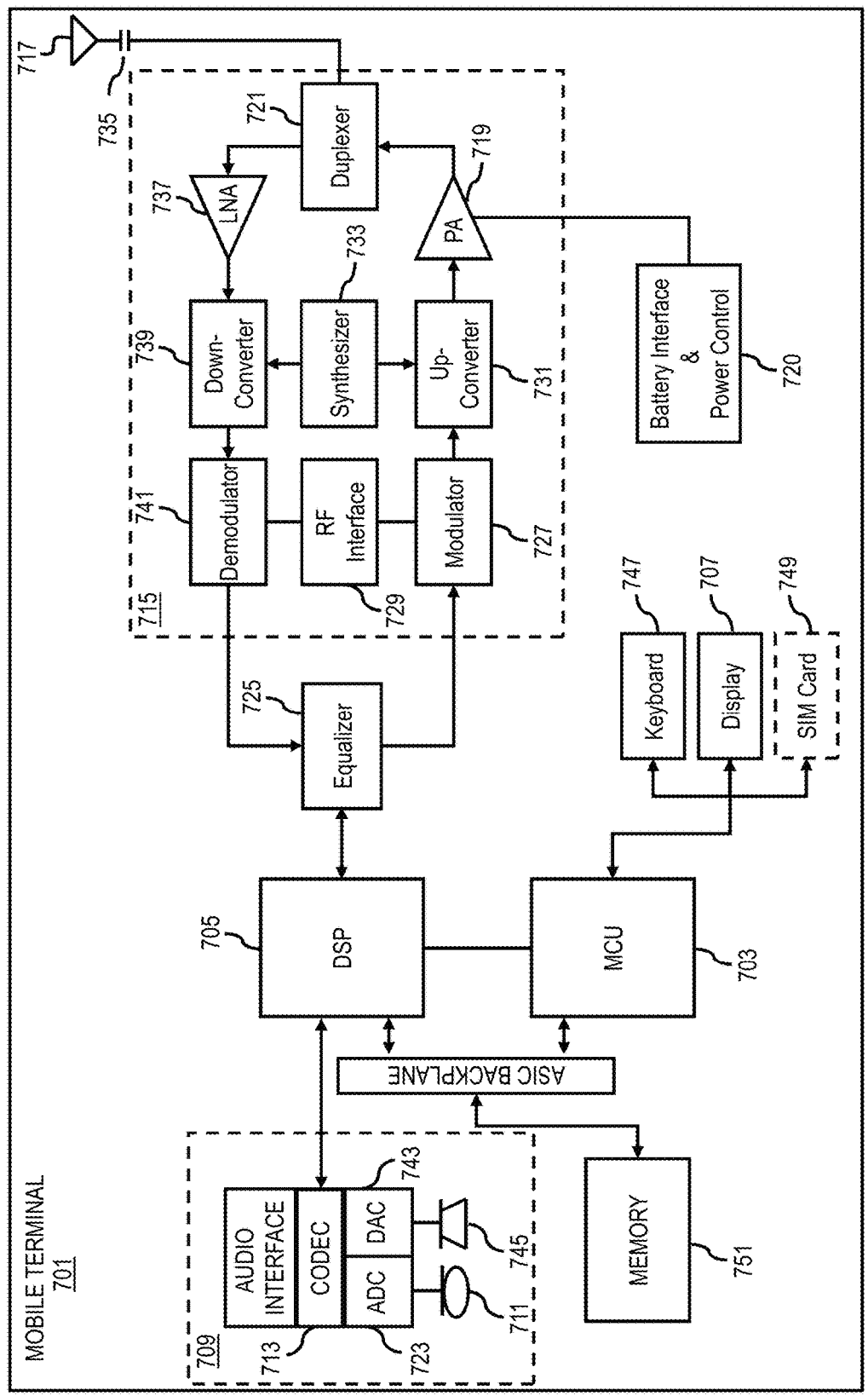
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 701, or a portion thereof, constitutes a means for performing one or more steps for managing of provisioning of a shared resource based on user or group defined control parameters. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps for managing of provisioning of a shared resource based on user or group defined control parameters. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 for managing to provision a shared resource based on user or group defined control parameters. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   in response to a request from a user for execution of one or more data processing tasks by a remote computing service, identifying, by an apparatus, the user and an association between the user and at least one of a plurality of user groups of an entity;
   retrieving, by the apparatus based on the association, at least one execution constraint associated with the user, the at least one user group, or a combination thereof to determine a maximum number of clusters, cluster instances, or a combination thereof of the remote computing service to be provisioned for fulfilling the request, wherein the at least one execution constraint is below execution constraints contracted between the entity and the remote computing service;
   initiating a comparison of the at least one execution constraint against an availability of one or more clusters, one or more cluster instances, or a combination thereof based on the execution of the at least one data processing task;
   determining a cost saving, a performance increase, or a combination thereof is achievable for the user, the at least one user group, or a combination thereof based on the comparison;
   initiating, by the apparatus, a provisioning of the one or more clusters, the one or more cluster instances, or a combination thereof to the user, the at least one user group, or a combination thereof to be within the maximum number of clusters, cluster instances, or a combination thereof based on the at least one execution constraint and to achieve the cost saving, the performance increase, or a combination thereof; and
   real-time monitoring and adjusting, by the apparatus, clusters and cluster instances being provisioned to the user or the at least one user group, for dynamically maintaining the at least one execution constraint and the execution constraints contracted between the entity and the remote computing service.

2. A method of claim 1, further comprising:
   determining a completion of execution of at least one of the one or more data processing tasks by at least one of the one or more clusters, at least one of the one or more cluster instances, or a combination thereof based on the provisioning; and initiating an assignment of at least one other of the one or more data processing tasks to the at least one of the one or more clusters, the at least one of the one or more cluster instances, or a combination thereof based on the completion of execution, wherein the provisioning is based on the assignment, and wherein the clusters and the cluster instances being provisioned to the user and the one or more other users are real-time adjusted via repurposing, configuration adjustment, or a combination thereof to meet the at least one execution constraint and the execution constraints.

3. A method of claim 2, further comprising:

determining a remaining number of the one or more data processing tasks assigned to a queue associated with the at least one of the one or more clusters, the at least one of the one or more cluster instances, or a combination thereof exceeds a backlog threshold specified by the user, the at least one user group, or a combination thereof; and initiating a provisioning of another cluster, another instance, or a combination thereof based on the backlog, wherein the assignment is based on the exceeding of the backlog threshold, and wherein the apparatus is a network platform separate from the entity and the remote computing service.

4. A method of claim 2, further comprising:

initiating an adjustment of a size of the at least one of the one or more clusters, the at least one of the one or more cluster instances, or a combination thereof based on the completion of execution; and initiating a termination of the at least one of the one or more clusters, at least one of the one or more cluster instances, or a combination thereof based on the completion of execution, wherein the adjustment is based on the assignment, the termination, or a combination thereof, and wherein the apparatus is implemented via a plurality of user devices of the users of the entity.

5. A method of claim 1, further comprising:

initiating another comparison of the at least one execution constraint against (a) a payment rate associated with the remote computing service, (b) a payment amount rendered by the user, the at least one user group, or a combination thereof to the remote computing service, (c) an estimated time of completion of execution of the one or more data processing tasks, (d) an estimated utilization of the remote computing service by the user, the at least one user group, or a combination thereof, or (e) a combination thereof; and determining another cost saving, another performance increase, or a combination thereof is achievable for the user, the at least one user group, or a combination thereof based on the another comparison, wherein the provisioning is further based on the another cost saving, the another performance increase, or a combination thereof.

6. A method of claim 5, wherein the execution constraint includes a cost limit, a performance limit, a cluster limit, a cluster instance limit, a time limit, a data limit, or a combination thereof assigned to the user, the at least one user group, or a combination thereof, and wherein the user and the association are identified via an account number, a job number, an internet protocol address, or a combination thereof.

7. A method of claim 5, further comprising:

determining that the cost savings, the performance increase, or a combination thereof is not achievable for the user, the at least one user group, or a combination thereof based on the comparison, wherein the provisioning is performed based on the determination.

8. A method of claim 1, further comprising:

initiating a presentation of a configuration interface on a user device; and receiving an input via the configuration interface specifying the at least one execution constraint, a backlog threshold, a cluster configuration type, or a combination thereof associated with the user, the at least one user group, or a combination thereof, wherein the request for execution of the one or more data processing tasks is based on the input.

9. A method of claim 8, wherein the cluster configuration type corresponds to (a) a size, a data processing capability, or a combination thereof of the one or more cluster instances, (b) an operating system requirement of the user, the at least one user group, or a combination thereof, (c) or a combination thereof, and wherein the configuration interface includes one or more fields for receiving a cost ceiling input, a performance level, a maximum number of clusters or cluster instances, a time limit, a backlog threshold, or a combination thereof.

10. A method of claim 1, wherein the remote computing service is a cloud based system, a distributed system, or a combination thereof and the one or more clusters include the one or more cluster instances, and wherein the apparatus is a server of the remote computing service that executes application programming interfaces facilitating user interactions with the remote computing service.

11. An apparatus comprising:

at least one processor; and at least one memory including computer program code for one or more programs, the at least one memory and the computer program code configured to, with the at least one processor, cause the apparatus to perform at least the following, in response to a request from a user for execution of one or more data processing tasks by a remote computing service, identify the user and an association between the user and at least one of a plurality of user groups of an entity;

retrieve, based on the association, at least one execution constraint associated with the user, the at least one user group, or a combination thereof to determine a maximum number of clusters, cluster instances, or a combination thereof of the remote computing service to be provisioned for fulfilling the request, wherein the at least one execution constraint is below execution constraints contracted between the entity and the remote computing service;

initiate a comparison of the at least one execution constraint against an availability of one or more clusters, one or more cluster instances, or a combination thereof based on the execution of the at least one data processing task;

determine a cost saving, a performance increase, or a combination thereof is achievable for the user, the at least one user group, or a combination thereof based on the comparison;

initiate a provisioning of one or more clusters, one or more cluster instances, or a combination thereof to the user, the at least one user group, or a combination thereof to be within the maximum number of clusters, cluster instances, or a combination thereof based on the at least one execution constraint and to achieve the cost saving, the performance increase, or a combination thereof; and real-time monitor and adjust clusters and cluster instances being provisioned to the user or the at least one user group, for dynamically maintaining the at least one execution constraint and the execution constraints contracted between the entity and the remote computing service.

12. An apparatus of claim 11, wherein the apparatus is further caused to:

determine a completion of execution of at least one of the one or more data processing tasks by at least one of the one or more clusters, at least one of the one or more cluster instances, or a combination thereof based on the provisioning; and initiate an assignment of at least one other of the one or more data processing tasks to the at least one of the one or more clusters, the at least one of the one or more cluster instances, or a combination thereof based on the completion of execution, wherein the provisioning is based on the assignment.

13. An apparatus of claim 12, wherein the apparatus is further caused to:

determine a remaining number of the one or more data processing tasks assigned to a queue associated with the at least one of the one or more clusters, the at least one of the one or more cluster instances, or a combination thereof exceeds a backlog threshold specified by the user, the at least one user group, or a combination thereof; and initiate a provisioning of another cluster, another instance, or a combination thereof based on the backlog, wherein the assignment is based on the exceeding of the backlog threshold.

14. An apparatus of claim 12, wherein the apparatus is further caused to:

initiate an adjustment of a size of the at least one of the one or more clusters, the at least one of the one or more cluster instances, or a combination thereof based on the completion of execution; and initiate a termination of the at least one of the one or more clusters, at least one of the one or more cluster instances, or a combination thereof based on the completion of execution, wherein the adjustment is based on the assignment, the termination, or a combination thereof.

15. An apparatus of claim 11, wherein the apparatus is further caused to: initiate another comparison of the at least one execution constraint against (a) a payment rate associated with the remote computing service, (b) a payment amount rendered by the user, the at least one user group, or a combination thereof to the remote computing service, (c) an estimated time of completion of execution of the one or more data processing tasks, (d) an estimated utilization of the remote computing service by the user, the at least one user group, or a combination thereof, or (e) combination thereof; and determine another cost saving, another performance increase, or a combination thereof is achievable for the user, the at least one user group, or a combination thereof based on the another comparison, wherein the provisioning is further based on the another cost saving, the another performance increase, or a combination thereof.

16. An apparatus of claim 15, wherein the execution constraint includes a cost limit, a performance limit, a cluster limit, a cluster instance limit, a time limit, a data limit, or a combination thereof assigned to the user, the at least one user group, or a combination thereof.

17. An apparatus of claim 15, wherein the apparatus is further caused to:

determine that the cost savings, the performance increase, or a combination thereof is not achievable for the user, the at least one user group, or a combination thereof based on the comparison, wherein the provisioning is performed based on the determination.

18. A non-transitory computer-readable storage medium carrying one or more sequences of one or more instructions which, when executed by one or more processors, cause an apparatus to perform:

in response to a request from a user for execution of one or more data processing tasks by a remote computing service, identifying the user and an association between the user and at least one of a plurality of user groups of an entity;

retrieving, based on the association, at least one execution constraint associated with the user, the at least one user group, or a combination thereof to determine a maximum number of clusters, cluster instances, or a combination thereof of the remote computing service to be provisioned for fulfilling the request, wherein the at least one execution constraint is below execution constraints contracted between the entity and the remote computing service;

initiating a comparison of the at least one execution constraint against an availability of one or more clusters, one or more cluster instances, or a combination thereof based on the execution of the at least one data processing task;

determining a cost saving, a performance increase, or a combination thereof is achievable for the user, the at least one user group, or a combination thereof based on the comparison;

initiating a provisioning of one or more clusters, one or more cluster instances, or a combination thereof to the user, the at least one user group, or a combination thereof to be within the maximum number of clusters, cluster instances, or a combination thereof based on the at least one execution constraint and to achieve the cost saving, the performance increase, or a combination thereof; and real-time monitoring and adjusting clusters and cluster instances being provisioned to the user or the at least one user group, for dynamically maintaining the at least one execution constraint and the execution constraints contracted between the entity and the remote computing service.

19. A non-transitory computer-readable storage medium of claim 18, wherein the apparatus is caused to further perform:

determining a completion of execution of at least one of the one or more data processing tasks by at least one of the one or more clusters, at least one of the one or more cluster instances, or a combination thereof based on the provisioning; and initiating an assignment of at least one other of the one or more data processing tasks to the at least one of the one or more clusters, the at least one of the one or more cluster instances, or a combination thereof based on the completion of execution, wherein the provisioning is based on the assignment.

20. A non-transitory computer-readable storage medium of claim 19, wherein the apparatus is caused to further perform:

determining a remaining number of the one or more data processing tasks assigned to a queue associated with the at least one of the one or more clusters, the at least one of the one or more cluster instances, or a combination thereof exceeds a backlog threshold specified by the user, the at least one user group, or a combination thereof; and initiating a provisioning of another cluster, another instance, or a combination thereof based on the backlog, wherein the assignment is based on the exceeding of the backlog threshold.

* * * * *